(12) United States Patent
Klaus-Dieter et al.

(10) Patent No.: US 12,479,585 B2
(45) Date of Patent: Nov. 25, 2025

(54) AIRCRAFT DE-ICING DETERMINATION SYSTEMS AND METHODS

(71) Applicant: THE BOEING COMPANY, Chicago, IL (US)

(72) Inventors: Albert Klaus-Dieter, Neu-isenburg (DE); Alexander Bellemare-Davis, Vancouver (CA); Yun Chu, New Westminster (CA); David Fundter, Gaiberg (DE); William Jenden, Vancouver (CA); Xu Xia Zhong, Richmond (CA)

(73) Assignee: THE BOEING COMPANY, Chicago, IL (US)

( * ) Notice: Subject to any disclaimer, the term of this patent is extended or adjusted under 35 U.S.C. 154(b) by 214 days.

(21) Appl. No.: 17/959,351

(22) Filed: Oct. 4, 2022

(65) Prior Publication Data
US 2024/0109664 A1 Apr. 4, 2024

(51) Int. Cl.
*B64D 15/22* (2006.01)
(52) U.S. Cl.
CPC .................................. *B64D 15/22* (2013.01)
(58) Field of Classification Search
None
See application file for complete search history.

(56) References Cited

U.S. PATENT DOCUMENTS

| | | | |
|---|---|---|---|
| 2021/0104164 A1* | 4/2021 | Erignac | G08G 5/51 |
| 2021/0150488 A1* | 5/2021 | Dziecielski | G07C 5/008 |
| 2023/0046264 A1* | 2/2023 | Zhang | G08G 5/21 |

OTHER PUBLICATIONS

Jonathan T. Lee, et al "Deicing Decision Support Tool", The 23rd Digital Avionics Systems Conference, Oct. 28, 2004, pp. 2.E,6-1-2.E.6-9.
Jason Bertino, et al, "21st Century, Fast-time Airport and Airspace Modeling Analysis with Simmod", www.faama.org managing the skies May/Jun. 2011, pp. 21-23.
Mengli Wu, et al, "Optimization Research of the Aircraft Deicing Problem", Advanced Materials Research, vols. 616-618, 1Dec. 3, 2012, pp. 1926-1929.

* cited by examiner

*Primary Examiner* — Lail A Kleinman
(74) *Attorney, Agent, or Firm* — Josef L. Hoffmann; The Small Patent Law Group LLC

(57) ABSTRACT

A system and a method include a control unit for determining a probable de-icing status for one or more aircraft scheduled to depart from one or more airports. The control unit is configured to determine the probable de-icing status based on a current date at the one or more airports, current weather at the one or more airports, and the actual de-icing status of a plurality of prior aircraft scheduled to depart from the one or more airports before the one or more aircraft.

20 Claims, 3 Drawing Sheets

AIRCRAFT DE-ICING DETERMINATION SYSTEMS AND METHODS

FIELD OF THE DISCLOSURE

Examples of the present disclosure generally relate to de-icing determination systems and methods for an aircraft at an airport.

BACKGROUND OF THE DISCLOSURE

Aircraft are used to transport passengers and cargo between various locations. Numerous aircraft depart from and arrive at a typical airport every day.

During periods of inclement weather, such as cold weather, aircraft undergo de-icing operations before taking off. A de-icing process removes ice, snow, or frost from an aircraft. De-icing is reactive, and is used to remove ice, snow, or frost that is already on an aircraft. In contrast, anti-icing is proactive, and is used to prevent such precipitation from accumulating on an aircraft. Both de-icing and anti-icing are performed at de-icing areas, such as de-icing pads. In some instances, de-icing is performed before anti-icing. Typically, an airport includes one or more de-icing areas where de-icing operations (including de-icing and/or anti-icing) occur. An aircraft can be de-iced while parked by a gate, and/or can taxi to a de-icing area to be de-iced.

Typically, an aircraft operator contacts de-icing personnel to request a de-icing operation. The de-icing personnel assigns and schedules the particular aircraft to a particular de-icing area. After the de-icing operation is completed, the aircraft operator reports to ground control personnel that the aircraft is ready to taxi to a runway. In general, communication between the aircraft operator, the de-icing personnel, and the ground control personnel occurs through telephones, radio devices, or the like. For example, the aircraft operator speaks to the de-icing personnel and the ground control personnel through radio devices.

Typically, pilots determine whether an aircraft needs to be de-iced. When a pilot decides that an aircraft needs de-icing, the pilot may also determine that an estimated time of departure will be delayed and that additional fuel may be needed, due to the added time for de-icing, movement to and from a de-icing area, and the like. However, little to no real-time information about de-icing operations exists for a pilot to reference when deciding whether or not to de-ice an aircraft. As such, aircraft operators are typically unaware of information that can be used to better determine taxi fuel estimates, predicted holdovers, departure times, and arrival times.

SUMMARY OF THE DISCLOSURE

A need exists for an improved de-icing determination system and method, such as can be used to predict when de-icing may be necessary. Further, a need exists for a system and a method that provide aircraft operators information regarding whether deicing is necessary. Additionally, a need exists for a system and a method that allow aircraft operators to make better informed decisions regarding taxi fuel estimates, predicted holdover, departure times, and arrival times.

With those needs in mind, certain examples of the present disclosure provide a system including a control unit for determining a probable de-icing status for one or more aircraft scheduled to depart from one or more airports. The control unit is configured to determine the probable de-icing status based on a current date at the one or more airports, current weather at the one or more airports, and the actual de-icing status of a plurality of prior aircraft scheduled to depart from the one or more airports before the one or more aircraft.

In at least one example, the one or more aircraft include a plurality of aircraft. In at least one example, the one or more airports include a plurality of airports. For example, the plurality of airports are throughout the entire world.

In at least one example, the control unit is configured to determine that de-icing is not necessary for the one or more aircraft when the current date is outside of a date range for de-icing at the one or more airports. As a further example, in response to determining that the current date is within the date range for de-icing at the one or more airports, the control unit is configured to determine if the current weather at the one or more airports includes icing conditions. As a further example, the control unit is configured to determine that de-icing is not necessary for the one or more aircraft when the current weather does not include the icing conditions. As a further example, in response to determining that the weather includes the icing conditions, the control unit is configured to determine the de-icing status of the plurality of prior aircraft scheduled to depart from the one or more airports in relation to a predetermined threshold de-icing time for the plurality of prior aircraft at one or more de-icing areas at the one or more airports.

In at least one example, the control unit is further configured to output a de-icing information signal to one or more user interfaces associated with one or more aircraft operators of the one or more aircraft. The de-icing information signal includes information relating to the probable de-icing status.

In at least one example, the control unit is further configured to automatically operate the one or more aircraft at the one or more airports based on the probable de-icing status.

Certain examples of the present disclosure provide a method including determining, by a control unit, a probable de-icing status for one or more aircraft scheduled to depart from one or more airports. Said determining is based on a current date at the one or more airports, current weather at the one or more airports, and the actual de-icing status of a plurality of prior aircraft scheduled to depart from the one or more airports before the one or more aircraft.

Certain examples of the present disclosure provide a non-transitory computer-readable storage medium comprising executable instructions that, in response to execution, cause one or more control units comprising a processor, to perform operations comprising: determining a probable de-icing status for one or more aircraft scheduled to depart from one or more airports, as described herein.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

In certain circumstances, aircraft require de-icing and/or anti-icing services prior to takeoff under adverse weather conditions (such as when the temperature is low enough for ice to form, and there is precipitation). Information regarding the current status of de-icing operations and any expected delays would assist pilots and dispatchers in flight planning, such as at airports where de-icing takes place at remote de-icing pads, rather than at the gate. Accordingly, examples of the present disclosure provide systems and methods for detecting remote de-icing events based on aircraft location data and airport topology data. The systems and methods described herein detect the occurrence, location, and duration of de-icing events, which may not depend on detailed knowledge of operations at individual airports, and can be scaled to many airports with little marginal development effort. In at least one example, the systems and methods observe an aircraft at a location identified as a de-icing area (such as a dedicated de-icing pad, a permanent or temporary de-icing location other than a de-icing pad, and/or the like), such as through automatic dependent surveillance-broadcast (ADS-B) data and airport map (for example, topology) data.

In examples, the de-icing determination systems and methods described herein are used to predict when de-icing operations may be necessary and/or in effect. The systems and methods described herein provide information to operators of aircraft to help them ascertain when de-icing may be necessary, for example.

Figure 1:
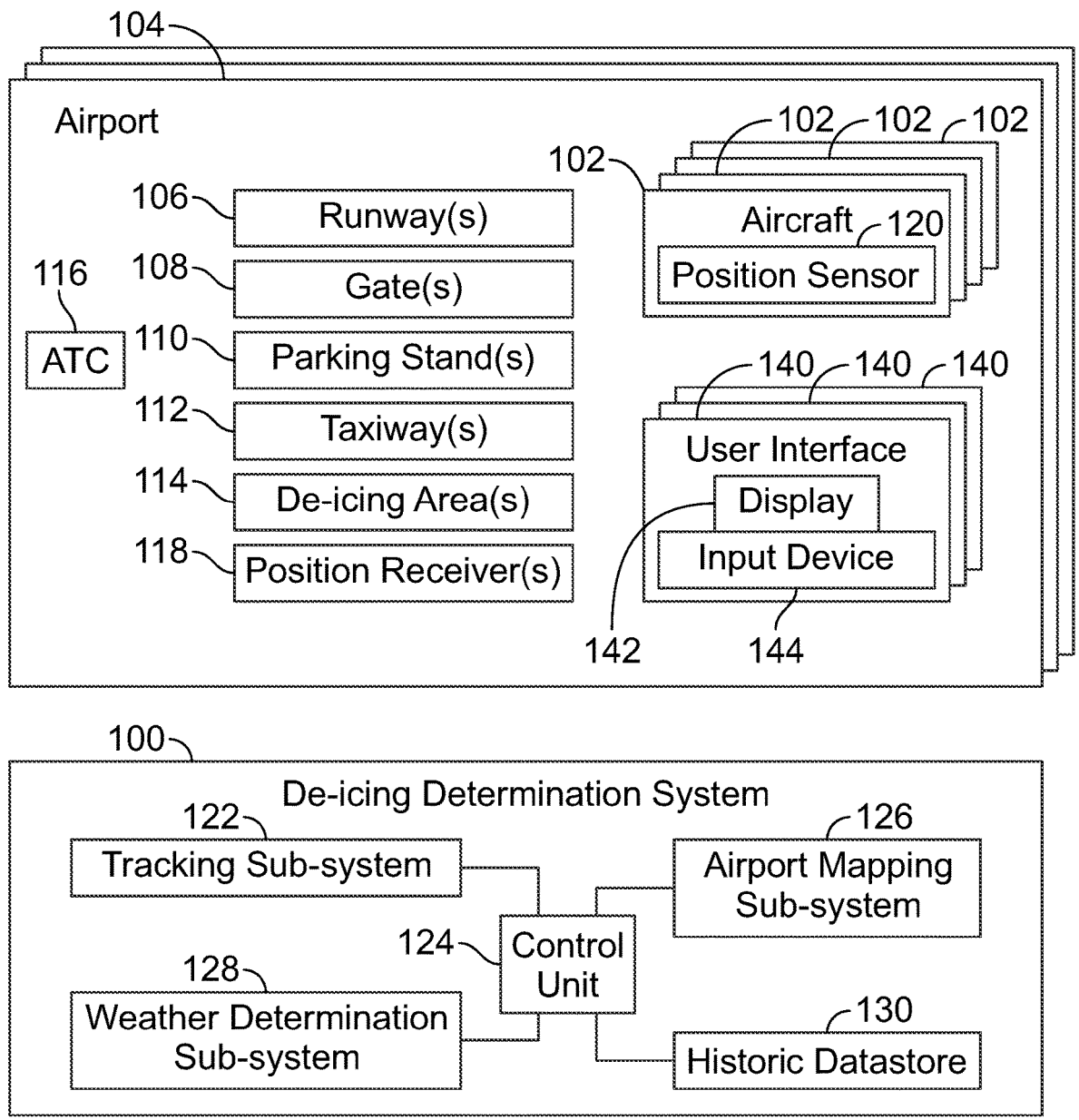
FIG. 1 illustrates a schematic block diagram of a de-icing determination system, according to an example of the present disclosure.

FIG. 1 illustrates a schematic block diagram of a de-icing determination system 100, according to an example of the present disclosure. The de-icing determination system 100 is configured to determine de-icing events of aircraft 102 at one or more airports 104. In one example, the de-icing determination system 100 is configured to determine de-icing events of aircraft 102 at numerous airports 104, such as a plurality of airports 104 within a city (for example, O'Hare International Airport and Midway International Airport in Chicago, Illinois), a state, a region including one or more states, one or more countries, a hemisphere, or the entire world. In a further example, the de-icing determination system 100 is configured to determine de-icing events of aircraft 102 at all of the airports 104 in such regions. In another example, the de-icing determination system 100 is configured to determine de-icing events of aircraft 102 at less than all of the airports 104 in such regions. As another example, the de-icing determination system 100 is configured to determine de-icing events of aircraft 102 at a single airport 104.

The airports 104 include various areas, such as one or more runways 108, one or more gates 108, one or more parking stands 110, one or more taxiways 112, and one or more de-icing areas 114. The airports 104 also include air traffic control (ATC) 116, which is configured to coordinate and schedule takeoff and landing of the aircraft 102 at the airports 104. The aircraft 102 are configured to travel among the runway(s) 106, the gate(s) 108, the parking stand(s) 110, the taxiway(s) 112, and the de-icing areas 114 at the airports 104. For example, the aircraft 102 are de-iced (that is, undergo de-icing operations) at the de-icing area(s) 114 of an airport(s) 104.

Positions of the aircraft 102 at the airports 104 are detected by one or more position receivers 118 that receive position signals output by position sensors 120 of the aircraft 102. For example, the position receivers 118 are ADS-B receivers that receiver ADS-B signals output by the positions sensors 120 of the aircraft 102. As another example, the position sensor 120 can be a global positioning system sensor. The position sensor 120 outputs a signal indicative of one or more of the position, altitude, heading, acceleration, velocity, and/or the like of the aircraft 102. The signal is received by the position receiver(s) 118, which is in communication with a tracking sub-system 122 of the de-icing determination system 100.

The de-icing determination system 100 includes a control unit 124 in communication with the tracking sub-system 122, an airport mapping sub-system 126, a weather determination sub-system 128, and a historic datastore 130, such as through one or more wired or wireless connections. Each of the control unit 124, the tracking sub-system 122, the airport mapping sub-system 126, the weather determination sub-system 128, and the historic datastore 130 can be remotely located from one another, or located at a common location (or a first subset can be commonly located, while a second subset, whether commonly located or not, can be remotely located from the first subset). The components of the de-icing determination system 100 can be located at an airport 104 or remotely located from the airport(s) 104.

A user interface 140 includes a display 142 and an input device 144, both of which can be in communication with the control unit 124. The display 142 can be a monitor, screen, television, touchscreen, and/or the like. The input device 144 can include a keyboard, mouse, stylus, touchscreen interface (that is, the input device 144 can be integral with the display 142), and/or the like.

In at least one example, the aircraft 102 includes a user interface 140. For example, a user interface 140 can be in communication with and/or form a part of a flight computer of an aircraft 102. As another example, a user interface 140 can be part of a separate computer workstation aboard an aircraft 102. As another example, the user interface 140 can be a handheld device, such as a smart phone, tablet, or the like, within an aircraft 102. Optionally, the user interface 140 can be located remotely from the aircraft 102, such as at an air traffic control location, a ground control location, and/or the like.

The control unit 124 can be in communication with the user interface(s) 140 through one or more wired (if at the same location), or wireless connections. For example, the control unit 124 can include a communication device, such as one or more antennas, transceivers, and/or the like, which allow for wireless communication with the user interface(s) 140. As another example, the control unit 124 and the user interface(s) 140 can be in communication through an intermediate medium, such as through the Internet, a private communication network, and/or the like.

The tracking sub-system 122 is configured to track a current position of an aircraft 102 at an airport 104. In at least one example, the tracking sub-system 122 is an ADS-B tracking sub-system. In such an example, the ADS-B tracking sub-system 122 determines a current position of an aircraft 102 via satellite navigation through a positional signal of the aircraft 102 output by the position sensor 120, which is received by the position receiver(s) 118. The position sensor 120 can be or include a transmitter that periodically outputs information about the aircraft 102, such as identification details, current position, current altitude, and current velocity. The tracking sub-system 122 receives the transmitted position signal from the position receiver(s) 118 to determine a current and real time position, heading, velocity, and the like of the aircraft 102. Alternatively, the tracking sub-system 1212 can be a radar system, GPS system, and/or other such system that is configured to track the position of the aircraft 102.

The airport mapping sub-system 126 maps a layout of each airport 104. For example, the airport mapping sub-system 126 provides airport map data regarding the various areas of the airport 104, such as the de-icing area 114. In at least one example, the airport mapping sub-system 126 locates areas of the airport 104, such as the de-icing area 114, through global position system (GPS) data. In at least one other example, the airport mapping sub-system 126 locates areas of the airport 104 through various sensors and features that are registered or otherwise associated with the various areas of the airport 104.

The weather determination sub-system 128 communicates the current weather at and proximate to the airport(s) 104 to the control unit 124. For example, the weather determination sub-system 128 can be a meteorological and weather service that is in communication with the control unit 124. In at least one other embodiment, the weather determination sub-system 128 can be an independent weather determination and forecasting system and/or service. For example, the weather determination sub-system 128 can include one or more Doppler radar installations.

The historic datastore 130 stores data regarding de-icing events. For example, the historic datastore 130 stores past seasonal data when de-icing was used at airports 104. The past seasonal data includes information regarding when de-icing may and may not be necessary at a particular airport. As an example, de-icing is not necessary at O'Hare International Airport in Chicago, Illinois between June and October. However, de-icing may be necessary at O'Hare International Airport between November and April.

In at least one example, the control unit 124 determines de-icing of aircraft 102 at an aircraft 102 at an airport 104 based on probabilities. For example, the control unit 124 receives data from the historic datastore 130 regarding when de-icing may be used at an airport. The control unit 124 includes or is otherwise in communication with an electronic calendar and/or clock to initially determine a current date. The control unit 124 compares the current date at the airport 104 with respect to the seasonal data stored in the historic datastore 130. If the current date is outside of the date range for de-icing at the airport 104, as stored in the historic datastore 130, the control unit 124 determines that de-icing is not occurring at the airport 104. The control unit 124 then outputs a de-icing information signal to the user interface 140 of an aircraft 102 at the airport 104 that is scheduled for departure (such as within 2 hours or less of departure) that aircraft 102 that have departed and/or are scheduled for departure have not been de-iced. The de-icing information signal includes information that can be shown on the display 142 of the user interface 140 (or broadcast through a speaker) indicating that de-icing of the aircraft 102 is not necessary, and the pilot may then plan accordingly (for example, there is no need for extra taxiing fuel and the departure will not be delayed by de-icing).

If, however, the control unit 124 determines that the current date is within a date range for de-icing at the airport 104, the control unit 124 then determines the current weather at the airport 104. In particular, the control unit 124 is in communication with the weather determination sub-system 128 and receives weather data therefrom. If the current weather at the airport 104 is dry (that is, no precipitation), and above a particular temperature threshold (for example, above 40 degrees Fahrenheit), the control unit 124 determines that there is no need for de-icing as icing conditions are not present. The control unit 124 then outputs a de-icing information signal to the user interface 140 of an aircraft 102 at the airport 104 that is scheduled for departure (such as within 2 hours or less of departure) that aircraft 102 that have departed and/or are scheduled for departure have not been de-iced. The temperature threshold can be greater or less than 40 degrees Fahrenheit. For example, the temperature threshold can be 32 degrees Fahrenheit. As another example, the temperature threshold can be 45 degrees Fahrenheit.

If, however, the control unit 124 determines from the weather data that the temperature is below the temperature threshold (such as below degrees Fahrenheit), the control unit 124 determines if there is precipitation, such as rain, snow, and/or ice. In response to the weather data indicating that the temperature is below the temperature threshold and that there is precipitation at the airport 104 (for example, icing conditions), the control unit 124 then determines that the aircraft 102 at the airport 104 have likely been and/or are being de-iced. In response, the control unit 124 then determines locations and movement of the aircraft 102 at the airport 104 from the tracking sub-system 122 and the airport mapping sub-system 126. In particular, the control unit 124 determines whether the aircraft 102 are moving toward and/or into the de-icing area(s) 114. The control unit 124 then determines the length of the time of the aircraft 102 at the de-icing areas 114, and compares the time of the aircraft 102 at the de-icing areas 114 with a predetermined threshold de-icing time, such as stored in a memory. For example, the predetermined threshold de-icing time can be between 10-20 minutes. If an aircraft 102 is at a de-icing area 114 for less than a lower time threshold (such as less than 10 minutes), the control unit 124 determines that the aircraft 102 has not been de-iced. If the aircraft 102 is at the de-icing area 114 for at least the lower time threshold and less than the upper time threshold (such as 20 minutes), the control unit 124 determines that the aircraft 102 has been de-iced. If the aircraft 102 is at the de-icing area 114 for longer than the upper time threshold, the aircraft 102 determines that the aircraft 102 is parked at the de-icing area 114 and may be experiencing a delay for a reason other than de-icing.

The predetermined threshold de-icing time can be less than 10 minutes or greater than 20 minutes. For example, the lower time threshold can be 5-10 minutes, and the upper time threshold can be 30 minutes or longer. It is to be understood that the noted time thresholds are merely exemplary.

Each aircraft 102 at the airport(s) 104 is tracked by the tracking sub-system 122, which receives position information of the aircraft 102 from the position receiver(s) 118 at the airport(s) 104. The control unit 124 receives position data indicative of the real-time, current positions of the aircraft 102 from the tracking sub-system 122. The control unit 124 determines the position of the aircraft 102 in relation to a location of the airport 104 (such as the de-icing area(s) 114) by correlating the position data with airport map data received from the airport mapping sub-system 126. As such, the control unit 124 determines a real-time, current position of the aircraft 102 at the airport 104. The control unit 124 can then store such data for aircraft arriving at, currently located at, and/or departing from the airport 104 over a predetermined time period, such as a current day, a week, a month, and/or the like. In this manner, the control unit 124 tracks movements and locations of numerous aircraft 102 at the airport(s) 104.

As an aircraft 102 enters a de-icing area 114, the control unit 124 detects the position of the aircraft 102 at the de-icing area 114, such as through analysis of the position data of the aircraft 102 received from the tracking sub-system 122 correlated with the airport map data received from the airport mapping sub-system 126. The control unit 124 records an entry time of the aircraft 102 as the aircraft 102 enters the de-icing area 114. As the aircraft 102 exits the de-icing area 114, the control unit 124 records an exit time of the aircraft 102 from the de-icing area 114. The control unit 124 then compares the entry time and the exit time to determine a time of that the aircraft 102 was at the de-icing area 114. In at least one example, the control unit 124 includes or is otherwise coupled to a timer that is active and tracks a total time from the entry time to the exit time. In at least one other example, the control unit 124 merely records the entry time and the exit time, and compares the times to determine the total time at the de-icing area 114 (such as by subtracting the entry time from the exit time).

The control unit 124 determines the de-icing status of the aircraft 102 at the airport 104 as described herein. The control unit 124 then outputs the de-icing information signal including information regarding de-icing of the aircraft 102 to the user interface 140 of the aircraft operator (such as a pilot or dispatcher) of an aircraft 102 that is scheduled for departure within a predetermined time period (such as within 2 hours of less) by the air traffic control 116 (which can be in communication with the control unit 124 through one or more wired or wireless connections). The information regarding de-icing can include the number of aircraft 102 at the airport 104 that have been de-iced, the types of aircraft 102 at the airport 104 that have been de-iced, and the overall time of de-icing (such as determined by the length of time for each aircraft 102 at a de-icing area 114). Based on such information, the aircraft operator can then decide whether or not to taxi the aircraft 102 to a de-icing area 114 to have the aircraft 102 de-iced. In this manner, the aircraft operator is able to make an informed decision regarding de-icing the aircraft 102, and further determine whether additional taxi-ing fuel should be added to the aircraft 102, whether there will be a departure delay, and/or the like.

In at least one other example, the control unit 124 can automatically operate the aircraft 102 at the one or more airports 104 based on the determined de-icing status for the aircraft 102. For example, when the control unit 124 deter-mines that the aircraft 102 should be de-iced, based on the number and type of aircraft 102 that have been de-iced at the airport 104, the control unit 124 may output a control signal to the aircraft that is scheduled for departure, and automati-cally operate the aircraft 102 to move the aircraft 102 to a de-icing area 114. In this manner, the control unit 124 may automatically determine whether or not an aircraft 102 scheduled for departure needs to be de-iced, and may then automatically control the aircraft 102 to move to the de-icing area 114. As another example, when the control unit 124 determines that de-icing is not necessary, the control unit 124 may output a control signal to the aircraft 102 that is scheduled for departure, and automatically operate the air-craft 102 to move along the taxiway(s) 112 and onto a runway 106. Optionally, the control unit 124 does not automatically control aircraft 102 to move to a de-icing area 114.

As described herein, the de-icing determination system 100 includes the control unit 124 for determining a probable de-icing status for one or more aircraft 102 (for example, one or more current aircraft) scheduled to depart from one or more airports 104. The control unit 124 is configured to determine the probable de-icing status based on a current date at the one or more airports 104, current weather at the one or more airports 104, and the actual de-icing status of a plurality of prior aircraft 102 scheduled to depart from the one or more airports 104 before the one or more aircraft 102. The probable de-icing status for the one or more aircraft is or otherwise includes whether or not the aircraft 102 is and/or or should be de-iced. The prior aircraft 102 are those aircraft 102 that have or are scheduled to depart before the one or more aircraft 102. The actual de-icing status of the plurality of prior aircraft 102 is or otherwise includes whether the plurality of prior aircraft 102 have or have not actually been de-iced.

In at least one example, the control unit 124 is further configured to output a de-icing information signal to one or more user interfaces 140 associated with one or more aircraft operators of the one or more aircraft 102 scheduled to depart the one or more airports 104. The de-icing infor-mation signal includes information relating to the probable de-icing status.

Figure 2:
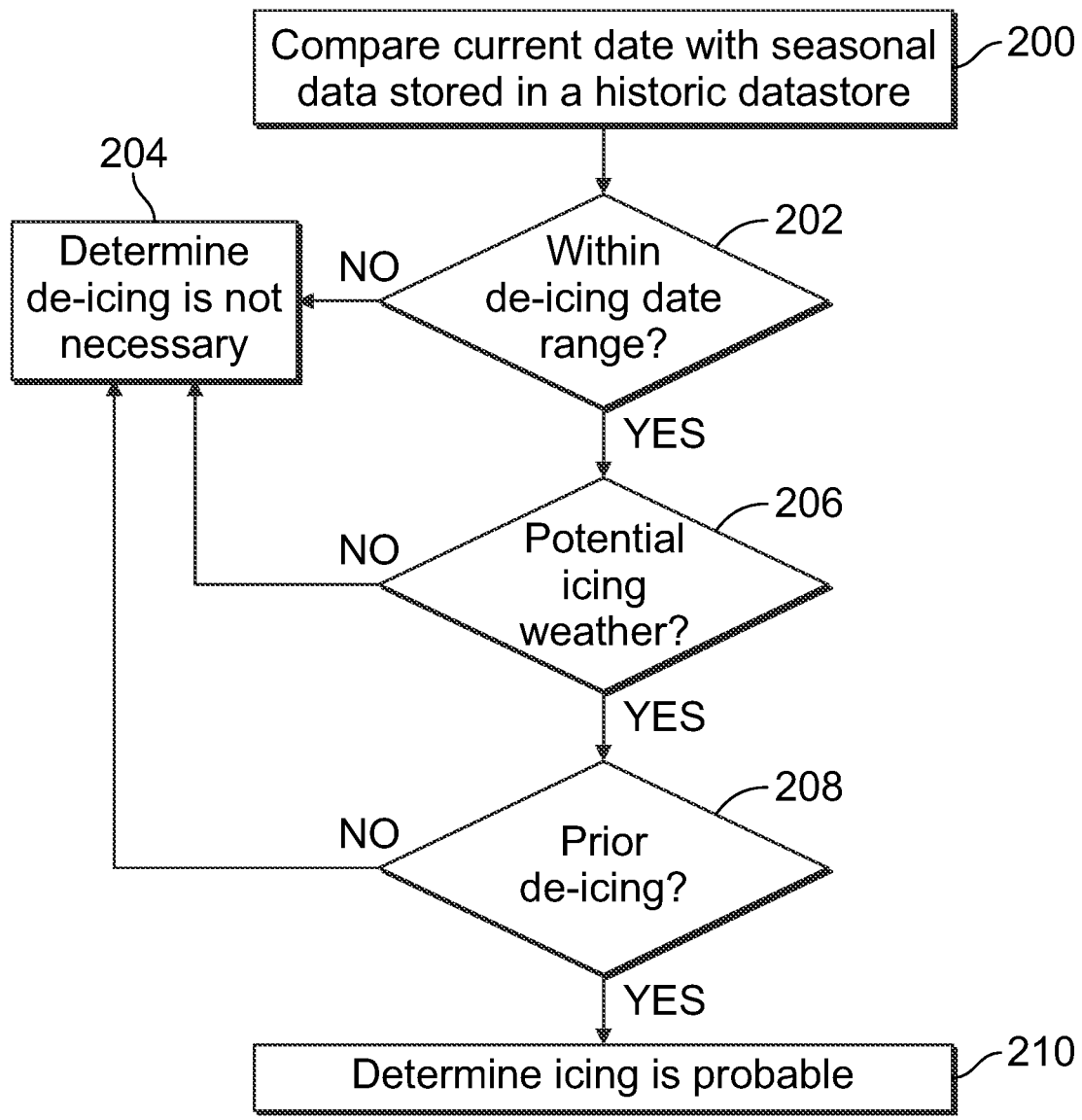
FIG. 2 illustrates a flow chart of a de-icing determination method, according to an example of the present disclosure.

FIG. 2 illustrates a flow chart of a de-icing determination method, according to an example of the present disclosure. Referring to FIGS. 1 and 2, at 200, the control unit 124 compares a current date with seasonal data for an airport 104 as stored in the historic datastore. If, at 202, the control unit 124 determines that the current date is outside of a de-icing date range for the airport 104, the method proceeds to 204, at which the control unit 124 determines that de-icing for an aircraft 102 is not necessary. The control unit 124 can then output an appropriate de-icing recommendation (such as no de-icing is necessary) to an operator of an aircraft 102 that is scheduled to depart from the airport 104.

If, however, the control unit 124 determines that the current date is within the de-icing date range for the airport 104 at 202, the method proceeds to 206, at which the control unit 124 determines if there are potential icing weather conditions (that is, the current weather includes icing con-ditions) at the airport 104. The control unit 124 determines whether there are potential icing weather conditions form weather data received from the weather determination sub-system 128. For example, potential icing weather conditions exist if the current temperature at the airport 104 is at or below a predetermined temperature threshold, and if there is precipitation at the airport 104. If there are not potential icing weather conditions, the method proceeds from 206 to 204, at which the control unit 124 determines that de-icing is not necessary.

If, however, the control unit 124 determines that there are potential icing weather conditions at the airport at 206, the method proceeds to 208, at which the control unit 124 determines whether prior aircraft that have departed or are scheduled to depart from the airport have de-iced or are de-icing. The control unit 124 determines such information based on position data of the aircraft 102 correlated with airport map data to determine whether the aircraft 102 were and/or are at de-icing area(s) 114 and the length of time at the de-icing areas(s) 114, as described herein. If it is deter-mined that the prior aircraft did not de-ice at the airport 104, the method proceeds from 208 to 204. If, however, at least some of the aircraft 102 did de-ice or are de-icing, the control unit 124 determines that icing is probable at 210. In determining that icing for an aircraft 102 scheduled to depart the airport 104 is probable at 210, the control unit 124 may output information to a user interface 140 of an aircraft operator indicating the number of prior aircraft 102 that de-iced, the types of such aircraft 102 that de-iced, and/or the like.

As described, the control unit 124 operators of aircraft 102 scheduled to depart an airport 104 can be notified of de-icing times of aircraft 102 that have already undergone de-icing operations, thereby allowing the aircraft operators to assess future times of de-icing operations. Accordingly, personnel are able to estimate upcoming times of upcoming de-icing operations for aircraft 102 during a particular day.

Figure 3:
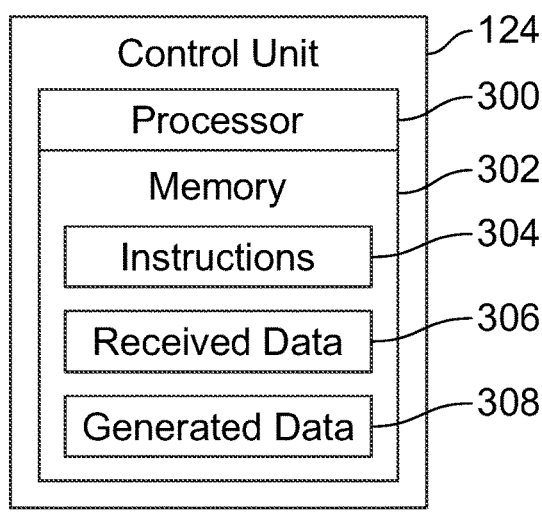
FIG. 3 illustrates a schematic block diagram of a control unit, according to an example of the present disclosure.

FIG. 3 illustrates a schematic block diagram of the control unit 124, according to an example of the present disclosure. In at least one example, the control unit 124 includes at least one processor 300 in communication with a memory 302. The memory 302 stores instructions 304, received data 306, and generated data 308. The control unit 124 shown in FIG. 3 is merely exemplary, and non-limiting.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 124 may be or include one or more processors that are configured to control operation, as described herein.

The control unit 124 is configured to execute a set of instructions that are stored in one or more data storage units or elements (such as one or more memories), in order to process data. For example, the control unit 124 may include or be coupled to one or more memories. The data storage units may also store data or other information as desired or needed. The data storage units may be in the form of an information source or a physical memory element within a processing machine.

The set of instructions may include various commands that instruct the control unit 124 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 124. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 124 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Referring to FIGS. 1-3, examples of the subject disclosure provide systems and methods that allow large amounts of data to be quickly and efficiently analyzed by a computing device. For example, the control unit 124 can analyze various aspects of weather data, position data of numerous aircraft 102, and the like at numerous airports 104 during a particular time period. As such, large amounts of data, which may not be discernable by human beings, are being tracked and analyzed. The vast amounts of data are efficiently organized and/or analyzed by the control unit 124, as described herein. The control unit 124 analyzes the data in a relatively short time in order to quickly and efficiently determine de-icing status in real-time. A human being would be incapable of efficiently analyzing such vast amounts of data in such a short time. As such, examples of the present disclosure provide increased and efficient functionality, and vastly superior performance in relation to a human being analyzing the vast amounts of data.

In at least one example, components of the system 100, such as the control unit 124, provide and/or enable a computer system to operate as a special computer system for determining de-icing status of numerous aircraft 102 at one or more airports 104. The control unit 124 improves upon standard computing devices by determining de-icing status of various aircraft 102 at one or more airports 104 in an efficient and effective manner.

In at least one example, all or part of the systems and methods described herein may be or otherwise include an artificial intelligence (AI) or machine-learning system that can automatically perform the operations of the methods also described herein. For example, the control unit 124 can be an artificial intelligence or machine learning system. These types of systems may be trained from outside information and/or self-trained to repeatedly improve the accuracy with how data is analyzed to determine the de-icing status of prior aircraft and current aircraft at one or more airports 104. Over time, these systems can improve by determining de-icing status with increasing accuracy and speed, thereby significantly reducing the likelihood of any potential errors. The AI or machine-learning systems described herein may include technologies enabled by adaptive predictive power and that exhibit at least some degree of autonomous learning to automate and/or enhance pattern detection (for example, recognizing irregularities or regularities in data), customization (for example, generating or modifying rules to optimize record matching), and/or the like. The systems may be trained and re-trained using feedback from one or more prior analyses of the data, ensemble data, and/or other such data. Based on this feedback, the systems may be trained by adjusting one or more parameters, weights, rules, criteria, or the like, used in the analysis of the same. This process can be performed using the data and ensemble data instead of training data, and may be repeated many times to repeatedly improve the determination of the de-icing status. The training minimizes conflicts and interference by performing an iterative training algorithm, in which the systems are retrained with an updated set of data (for example, data received before, during, and/or after each flight of the aircraft 102) and based on the feedback examined prior to the most recent training of the systems. This provides a robust analysis model that can better determine the most cost effective and efficient de-icing status for the various aircraft 102 at the airport(s) 104.

Figure 4:
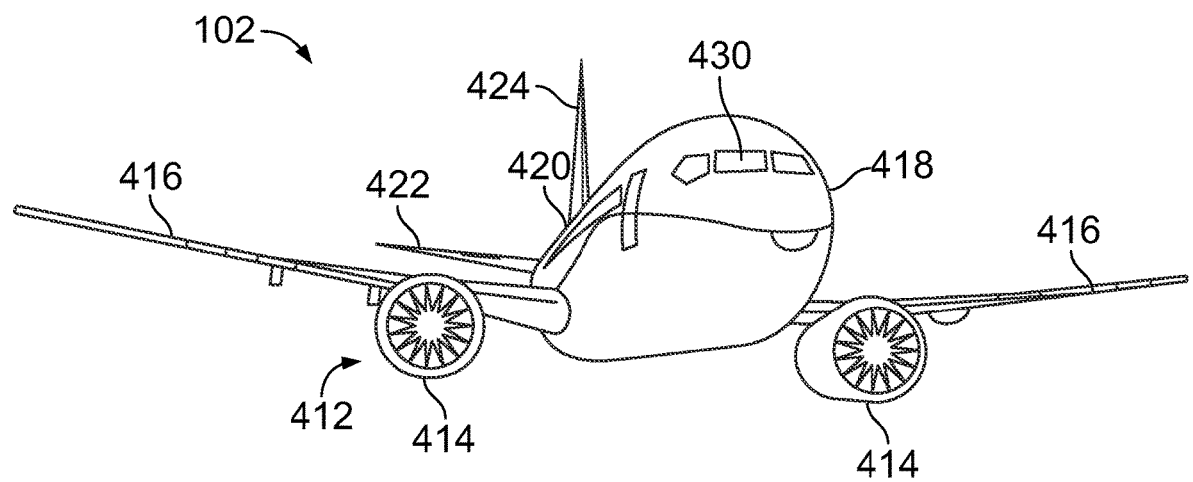
FIG. 4 illustrates a perspective front view of an aircraft, according to an example of the present disclosure.

FIG. 4 illustrates a perspective front view of an aircraft 102, according to an example of the present disclosure. The aircraft 102 includes a propulsion system 412 that includes engines 414, for example. Optionally, the propulsion system 412 may include more engines 414 than shown. The engines 414 are carried by wings 416 of the aircraft 102. In other examples, the engines 414 may be carried by a fuselage 418 and/or an empennage 420. The empennage 420 may also support horizontal stabilizers 422 and a vertical stabilizer 424. The fuselage 418 of the aircraft 102 defines an internal cabin 430, which includes a flight deck or cockpit, one or more work sections (for example, galleys, personnel carry-on baggage areas, and the like), one or more passenger sections (for example, first class, business class, and coach sections), one or more lavatories, and/or the like. FIG. 4 shows an example of an aircraft 102. It is to be understood that the aircraft 102 can be sized, shaped, and configured differently than shown in FIG. 4.

Further, the disclosure comprises examples according to the following clauses:

Clause 1. A system comprising:
a control unit for determining a probable de-icing status for one or more aircraft scheduled to depart from one or more airports, the control unit configured to determine the probable de-icing status based on a current date at the one or more airports, current weather at the one or more airports, and the actual de-icing status of a plurality of prior aircraft scheduled to depart from the one or more airports before the one or more aircraft.

Clause 2. The system of Clause 1, wherein the one or more aircraft comprise a plurality of aircraft.

Clause 3. The system of Clauses 1 or 2, wherein the one or more airports comprise a plurality of airports.

Clause 4. The system of Clause 3, wherein the plurality of airports are throughout the entire world.

Clause 5. The system of any of Clauses 1-4, wherein the control unit is configured to determine that de-icing is not necessary for the one or more aircraft when the current date is outside of a date range for de-icing at the one or more airports.

Clause 6. The system of Clause 5, wherein, in response to determining that the current date is within the date range for de-icing at the one or more airports, the control unit is configured to determine if the current weather at the one or more airports includes icing conditions.

Clause 7. The system of Clause 6, wherein the control unit is configured to determine that de-icing is not necessary for the one or more aircraft when the current weather does not include the icing conditions.

Clause 8. The system of Clause 7, wherein in response to determining that the weather includes the icing conditions, the control unit is configured to determine the de-icing status of the plurality of prior aircraft scheduled to depart from the one or more airports in relation to a predetermined threshold de-icing time for the plurality of prior aircraft at one or more de-icing areas at the one or more airports.

Clause 9. The system of any of Clauses 1-8, wherein the control unit is further configured to output a de-icing information signal to one or more user interfaces associated with one or more aircraft operators of the one or more aircraft, wherein the de-icing information signal includes information relating to the probable de-icing status.

Clause 10. The system of any of Clauses 1-10, wherein the control unit is further configured to automatically operate the one or more aircraft at the one or more airports based on the probable de-icing status.

Clause 11. A method comprising:
determining, by a control unit, a probable de-icing status for one or more aircraft scheduled to depart from one or more airports, wherein said determining is based on a current date at the one or more airports, current weather at the one or more airports, and the actual de-icing status of a plurality of prior aircraft scheduled to depart from the one or more airports before the one or more aircraft.

Clause 12. The method of Clause 11, wherein the one or more aircraft comprise a plurality of aircraft, and wherein the one or more airports comprise a plurality of airports.

Clause 13. The method of Clause 12, wherein the plurality of airports are throughout the entire world.

Clause 14. The method of any of Clauses 11-13, wherein said determining comprises determining that de-icing is not necessary for the one or more aircraft when the current date is outside of a date range for de-icing at the one or more airports.

Clause 15. The method of Clause 14, wherein, in response to determining that the current date is within the date range for de-icing at the one or more airports, said determining further comprises determining if the current weather at the one or more airports includes icing conditions.

Clause 16. The method of Clause 15, wherein said determining further comprises determining that de-icing is not necessary for the one or more aircraft when the current weather does not include the icing conditions.

Clause 17. The method of Clause 16, wherein in response to determining that the weather includes the icing conditions, said determining further comprises determining the de-icing status of the plurality of prior aircraft scheduled to depart from the one or more airports in relation to a predetermined threshold de-icing time for the plurality of prior aircraft at one or more de-icing areas at the one or more airports.

Clause 18. The method of any of Clauses 11-17, further comprising outputting, by the control unit, a de-icing information signal to one or more user interfaces associated with one or more aircraft operators of the one or more aircraft, wherein the de-icing information signal includes information relating to the probable de-icing status.

Clause 19. The method of any of Clauses 11-18, further comprising automatically operating, by the control unit, the one or more aircraft at the one or more airports based on the probable de-icing status.

Clause 20. A non-transitory computer-readable storage medium comprising executable instructions that, in response to execution, cause one or more control units comprising a processor, to perform operations comprising:

determining a probable de-icing status for one or more aircraft scheduled to depart from one or more airports, wherein said determining is based on a current date at the one or more airports, current weather at the one or more airports, and the actual de-icing status of a plurality of prior aircraft scheduled to depart from the one or more airports before the one or more aircraft.

As described herein, examples of the present disclosure provide improved de-icing determination systems and methods. Further, examples of the present disclosure provide systems and methods that provide aircraft operators information regarding whether deicing is necessary. Additionally, examples of the present disclosure provide systems and methods that allow aircraft operators to make better informed decisions regarding taxi fuel estimates, predicted holdovers, departure times, and arrival times.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:
   one or more aircraft including one or more position sensors configured to output one or more position signals, wherein the one or more aircraft are scheduled to depart from one or more airports;
   one or more position receivers configured to receive the one or more position signals output by the one or more position sensors;
   a tracking sub-system in communication with the one or more position receivers, wherein the tracking sub-system is configured to track one or more positions of the one or more aircraft;
   a user interface including a display; and
   a control unit including one or more processors, wherein the control unit is in communication with the tracking sub-system and the user interface, the control unit configured to:
      determine whether a current date at the one or more airports is within a de-icing date range,
      determine a probable de-icing status for the one or more aircraft scheduled to depart from the one or more airports based on whether the current date at the one or more airports is within a de-icing date range, current weather at the one or more airports, and the actual de-icing status of a plurality of prior aircraft scheduled to depart from the one or more airports before the one or more aircraft, and
      automatically operate the one or more aircraft at the one or more airports based on the probable de-icing status.

2. The system of claim 1, wherein the one or more aircraft comprise a plurality of aircraft.

3. The system of claim 1, wherein the one or more airports comprise a plurality of airports.

4. The system of claim 3, wherein the plurality of airports are throughout the entire world.

5. The system of claim 1, wherein the control unit is further configured to determine that de-icing is not necessary for the one or more aircraft when the current date is outside of the de-icing date range.

6. The system of claim 5, wherein, in response to determining that the current date is within the de-icing date range, the control unit is further configured to determine if the current weather at the one or more airports includes icing conditions.

7. The system of claim 6, wherein the control unit is further configured to determine that de-icing is not necessary for the one or more aircraft when the current weather does not include the icing conditions.

8. The system of claim 7, wherein in response to determining that the weather includes the icing conditions, the control unit is further configured to determine the de-icing status of the plurality of prior aircraft scheduled to depart from the one or more airports in relation to a predetermined threshold de-icing time for the plurality of prior aircraft at one or more de-icing areas at the one or more airports.

9. A method comprising:
   outputting, by one or more position sensors of one or more aircraft, one or more position signals, wherein the one or more aircraft are scheduled to depart from one or more airports;

receiving, by one or more position receivers, the one or more position signals output by the one or more position sensors;

tracking, by a tracking sub-system in communication with the one or more position sensors, one or more positions of the one or more aircraft;

determining, by a control unit including one or more processors, a probable de-icing status for one or more aircraft scheduled to depart from one or more airports, wherein said determining is based on whether a current date at the one or more airports is within a de-icing date range, current weather at the one or more airports, and the actual de-icing status of a plurality of prior aircraft scheduled to depart from the one or more airports before the one or more aircraft; and automatically operating the one or more aircraft at the one or more airports based on the probable de-icing status.

10. The method of claim 9, wherein the one or more aircraft comprise a plurality of aircraft, and wherein the one or more airports comprise a plurality of airports.

11. The method of claim 10, wherein the plurality of airports are throughout the entire world.

12. The method of claim 9, wherein said determining comprises determining that de-icing is not necessary for the one or more aircraft when the current date is outside of the de-icing date range.

13. The method of claim 12, wherein, in response to determining that the current date is within the de-icing date range, said determining further comprises determining if the current weather at the one or more airports includes icing conditions.

14. The method of claim 13, wherein said determining further comprises determining that de-icing is not necessary for the one or more aircraft when the current weather does not include the icing conditions.

15. The method of claim 14, wherein in response to determining that the weather includes the icing conditions, said determining further comprises determining the de-icing status of the plurality of prior aircraft scheduled to depart from the one or more airports in relation to a predetermined threshold de-icing time for the plurality of prior aircraft at one or more de-icing areas at the one or more airports.

16. A system comprising:
one or more aircraft including one or more position sensors configured to output one or more position signals, wherein the one or more aircraft are scheduled to depart from one or more airports;

one or more position receivers configured to receive the one or more position signals output by the one or more position sensors;

a tracking sub-system in communication with the one or more position receivers, wherein the tracking sub-system is configured to track one or more positions of the one or more aircraft;

a control unit including one or more processors, wherein the control unit is in communication with the tracking sub-system and the user interface, the control unit configured to:

determine whether a current date at the one or more airports is within a de-icing date range, determine a probable de-icing status for the one or more aircraft scheduled to depart from the one or more airports based on whether the current date at the one or more airports is within a de-icing date range, current weather at the one or more airports, and the actual de-icing status of a plurality of prior aircraft scheduled to depart from the one or more airports before the one or more aircraft, determine that de-icing is not necessary for the one or more aircraft when the current date is outside of a date range for de-icing at the one or more airports, in response to determining that the current date is within the date range for de-icing at the one or more airports, determine if the current weather at the one or more airports includes icing conditions, determine that de-icing is not necessary for the one or more aircraft when the current weather does not include the icing conditions, in response to determining that the weather includes the icing conditions, determine the de-icing status of the plurality of prior aircraft scheduled to depart from the one or more airports in relation to a predetermined threshold de-icing time for the plurality of prior aircraft at one or more de-icing areas at the one or more airports; and automatically operating the one or more aircraft at the one or more airports based on the probable de-icing status.

17. The system of claim 16, wherein the one or more aircraft comprise a plurality of aircraft.

18. The system of claim 1, further comprising a speaker on the aircraft that broadcasts that de-icing of the aircraft is not necessary based on the probable de-icing status in response to determining the probable de-icing status is that de-icing is not necessary.

19. System of claim 16, further comprising a speaker on the aircraft that broadcasts that de-icing of the aircraft is not necessary based on the probable de-icing status in response to determining the probable de-icing status is that de-icing is not necessary.

20. The method of claim 9, further comprising broadcasting through a speaker of an aircraft of the one or more aircraft that de-icing of the aircraft is not necessary based on the probable de-icing status.

\* \* \* \* \*